Sept. 8, 1959 J. L. PORTER 2,903,338
PROCESS FOR PREPARING CALCIUM ALUMINATE AND
ALUMINA FROM PHOSPHATE-CONTAINING ORES
Filed July 8, 1953
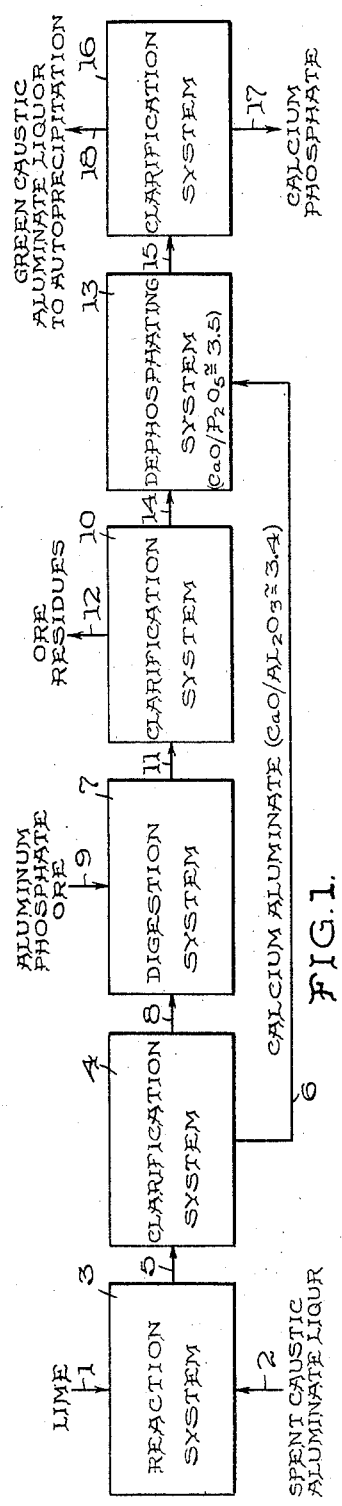
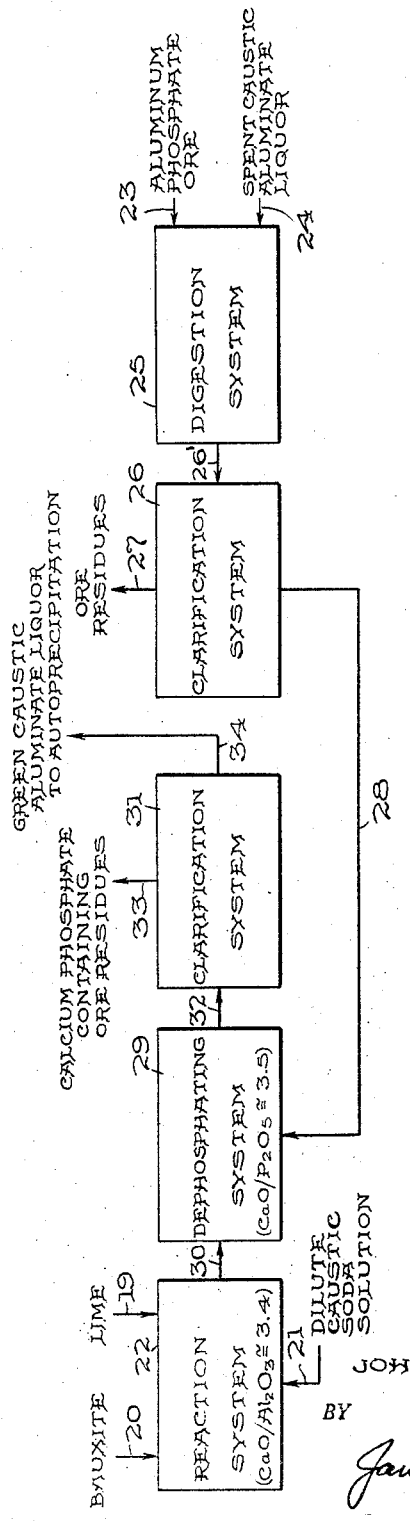
INVENTORS
JOHN L. PORTER
BY
James E. Toomey
ATTORNEY

United States Patent Office 2,903,338
Patented Sept. 8, 1959

2,903,338

PROCESS FOR PREPARING CALCIUM ALUMINATE AND ALUMINA FROM PHOSPHATE-CONTAINING ORES

John L. Porter, Baton Rouge, La., assignor to Kaiser Aluminum & Chemical Corporation, Oakland, Calif., a corporation of Delaware Application July 8, 1953, Serial No. 366,765

22 Claims. (Cl. 23—52)

This invention relates to a method for producing calcium aluminate and method for dephosphating caustic aluminate liquors in an alkaline process for the recovery of alumina from aluminous ores.

As is known, the aluminous and phosphate values from ores containing minerals such as wavellite and pseudo wavellite (crandallite), may be solubilized in caustic liquors and the valuable components selectively recovered. For example, the soluble sodium phosphate values may be insolubilized from the sodium aluminate values by cooling whereafter the aluminate values may be recovered by conventional autoprecipitation practice such as performed in Bayer operations or by carbonation.

Still another method of separating the solubilized aluminate and phosphate values is to insolubilize the phosphate values with lime to form insoluble calcium phosphate whereafter the aluminate values may again be recovered by autoprecipitation or carbonation as the case may be.

In the production of alumina for the electrolytic reduction of aluminum, the $P_2O_5$ content of the caustic liquors must be substantially removed and accordingly, cooling the green caustic aluminate liquors containing sodium phosphates to crystallize the sodium phosphate therefrom is undesirable because of the low temperatures necessary for substantial removal of the $P_2O_5$ content. For example, temperatures around 0° C. are required for substantially complete removal of the sodium phosphate from the caustic aluminate lyes.

On the other hand, treatment with lime to remove and recover the $P_2O_5$ content of the liquors has adverse effects on subsequent processing of the green caustic aluminate liquors for the recovery of the alumina hydrate content. Thus, the solubility of alumina in caustic solutions depends on the caustic soda content. Since causticizing sodium phosphate with lime produces free NaOH, the increased caustic soda content necessarily increasing the amount of alumina remaining in solution when recovery is by auto-precipitation. Likewise, when recovery of the alumina hydrate is by carbonation greater amounts of $CO_2$ per unit recovery of hydrate are required.

In Bayer practice the solubility of the alumina (A) in caustic solutions is reported as a weight ratio (A/C) of alumina (A) to caustic soda (C). The caustic soda (C or C.S.) concentration is a measure of the soda present in the caustic liquor as sodium aluminate and as free sodium hydroxide. Total soda (S or T.S.) represents the sum of the caustic soda (C or C.S.) and the sodium carbonate which is always found in Bayer liquors. With phosphate values present in solution, the caustic soda (C or C.S.) does not include the soda in combination with the phosphates but said soda values are determined from the $P_2O_5$ content. The alumina is reported as $Al_2O_3$ and caustic soda and total soda are reported as the equivalent $Na_2CO_3$.

According to the process herein described, the $P_2O_5$ content of the liquors resulting from the alkaline decomposition of such ores as wavellite may be insolubilized as calcium phosphate while at the same time minimizing the effect of the sodium hydroxide produced by the causticizing reaction with the calcium ion when the reaction is carried out with calcium aluminate. Thus, it becomes apparent that the decrease in A/C ratio of the green caustic aluminate liquors which accompanies the dephosphating reaction with the calcium ion will be minimized to the extent that the alumina values associated with the calcium aluminate are solubilized to combine with the free caustic produced by the reaction.

Obviously, calcium aluminate from any source may be employed for dephosphating purposes. However, as an incident to the method of dephosphating the pregnant caustic aluminate liquors, the calcium aluminate may be produced in the Bayer cycle by reacting lime with the caustic aluminate spent liquors. Consequently, the method of producing calcium aluminate may advantageously be integrated into the alkaline process for recovering the aluminate values.

As still another source of calcium aluminate for the dephosphating reaction, it has been discovered that the hydrated alumina content of bauxites may be transformed to calcium aluminate by reaction with lime in the presence of small amounts of caustic soda. Because of the mild conditions under which was discovered that this transformation of the hydrated alumina content may be made to proceed, it is an extremely important discovery as regards the recovery of the alumina content of high silica bauxites. Thus, the mild conditions minimize the caustic attack on the siliceous components of the ores, the wet alkaline treatments of the high silica bauxites having not, heretofore, been deemed feasible because of the formation of alkali aluminum silicates. Thus, the method of transforming the hydrated alumina content of siliceous ores to calcium aluminate in the past has been by the expensive sinter processes. Consequently, the method of producing calcium aluminate herein described may be employed for obtaining a raw material for the Pedersen $Na_2CO_3$ leach process as well as for dephosphating purposes. It is apparent, of course, that calcium aluminate produced by the well known sinter processes may also be used for dephosphating purposes as well as calcium aluminate from the other sources mentioned above.

Therefore, it is an object of the herein described invention to provide a method for dephosphating caustic aluminate liquors.

It is another object of the invention to provide a method of removing the phosphate content of the caustic aluminate lyes resulting from the alkaline decomposition of aluminous phosphatic ores.

It is a further object to provide a method of producing calcium aluminate within a Bayer type extraction operation for the purpose of utilizing said calcium aluminate for removing the phosphate content of the liquors resulting from the extraction of aluminum phosphates from wavellite or pseudo wavellite type ores.

As another object, it is intended to provide a method of transforming the alumina content of bauxites to calcium aluminate.

In particular, it is an object to provides a method of transforming the alumina content of high silica bauxites such as those found in Arkansas to calcium aluminate.

Still further, it is an object of the invention to provide a wet alkaline method of transforming the alumina content of bauxites to calcium aluminate without suffering appreciable losses of alumina and alkali values as insoluble silicates.

It is another object to provide a method of dephosphating caustic aluminate liquors resulting from the alkaline treatment of aluminous phosphatic ores characterized by the fact that aluminate values are added to the liquors simultaneously to the dephosphating reaction.

It is a further object to provide a method of dephosphating caustic aluminate liquors by employing calcium aluminate containing residues from the transformation of the alumina content of bauxites to calcium aluminate.

It is a further object to provide a method of dephosphating caustic aluminate liquors so as to obtain a higher resulting A/C ratio after dephosphating than obtained by dephosphating with lime or slaked lime.

Other objects will become apparent from the following description, tables and figures.

In Bayer operations, less than about 2 grams of $P_2O_5$ per liter are desired in the green liquor used for the autoprecipitation of alumina trihydrate in order that a calcined alumina product acceptably low in phosphate values for reduction purposes may be obtained. Accordingly, for the attainment of a caustic aluminate liquor substantially free of soluble phosphate values and acceptable for the production of reduction grade alumina by autoprecipitation, it is desirable to charge an excess of calcium aluminate to the sodium phosphate containing liquors so that at least 3 mols of lime are supplied per mol of $P_2O_5$ content of the liquors. The $CaO/P_2O_5$ mol ratio, herein used, is a measure of the lime equivalents associated with the calcium aluminate to either the $P_2O_5$ content of the liquor to be insolubilized or to the $P_2O_5$ content of the ore which is caustic soluble and which further is to be insolubilized as calcium phosphate. Thus, a $CaO/P_2O_5$ charging ratio of at least 3 is necessary for substantially complete dephosphating with about 3.5 preferred. Higher $CaO/P_2O_5$ ratios are productive of good dephosphating results but above a $CaO/P_2O_5$ ratio of about 4.0 the use of calcium aluminate is uneconomical.

For the purpose of recovering as much of the alumina values of the calcium aluminate as possible and thereby supplying alumina to the caustic aluminate solutions so as to maintain a high A/C ratio, a calcium aluminate having a molar ratio of $CaO/Al_2O_3$ between about 3 and 3.6 are highly desirable with a $CaO/Al_2O_3$ ratio about 3.4 being preferred. As used herein, the $CaO/Al_2O_3$ ratio is a mol ratio of the lime equivalents associated with the calcium aluminate as calcium aluminate and/or as free lime to the alumina values associated with the calcium aluminate. This ratio is also used for indicating the amount of lime added during the transformation of the hydrated alumina content of a bauxite to calcium aluminate and is a mol ratio of the lime added to the available alumina of the bauxite, as will become apparent.

The material presented in Table I clearly brings out the dephosphating that may be accomplished by utilizing calcium aluminate therefor. Furthermore, the material clearly shows the formation of calcium aluminate by reacting lime with spent caustic aluminate liquors and subsequent use thereof for removing the $P_2O_5$ content of a green caustic aluminate liquor such as might be obtained from the alkaline decomposition of a wavellite type of ore.

For the three experimental runs, lime was added to the spent liquor and reacted therewith for 30 minutes at 100° C. whereafter the insoluble products were clarified as a high solids containing slurry by centrifuging. Thereafter, the solids, being principally calcium aluminate, were mixed with the green liquor to be dephosphated.

Consequently, for run 1, 6.244 grams of lime, reported as the equivalent calcium carbonate, were mixed with 100 mls. of a spent liquor having an A/C ratio of .3482 and C/S ratio of .9659 and having a caustic soda concentration of 197.35 grams per liter. The mixture was then reacted for 30 minutes at 100° C. and the insoluble reaction products removed by centrifuging as a high solids containing sludge. It was determined that the sludge contained insoluble calcium aluminate having a mol ratio of $CaO/Al_2O_3$ of 3.28 and contained 1.943 grams of $Al_2O_3$ therewith. Associated with the liquor in the calcium aluminate sludge was .4 gram of $Al_2O_3$.

The calcium aluminate sludge was then mixed with a high A/C ratio green liquor such as results from the alkaline decomposition of a wavellite type ore. Thus, 100 mls. of a green liquor of indicated analysis and containing 27.15 grams per liter $P_2O_5$ was mixed with the calcium aluminate sludge and reacted therewith for 30 minutes at 100° C. The $CaO/P_2O_5$ mol ratio for the charge was 3.27 for this particular run (run 1).

After the reaction, it was determined that the $P_2O_5$ content was 1.41 grams per liter and that 92.6% of the $P_2O_5$ content of the green caustic aluminate liquor had been insolubilized.

Table I

FORMATION OF CALCIUM ALUMINATE

| | Run 1 | Run 2 | Run 3 |
|---|---|---|---|
| Spent Liquor: | | | |
| $Al_2O_3$ (grams/liter) | 68.72 | 68.72 | 68.72 |
| C.S. (grams/liter) | 197.35 | 197.35 | 197.35 |
| T.S. (grams/liter) | 204.32 | 204.32 | 204.32 |
| A/C | .3482 | .3482 | .3482 |
| C/S | .9659 | .9659 | .9659 |
| $Al_2O_3$ (grams in sample) | 6.872 | 6.872 | 6.872 |
| C.S. (grams in sample) | 19.74 | 19.74 | 19.74 |
| T.S. (grams in sample) | 20.43 | 20.43 | 20.43 |
| Lime Addition: | | | |
| CaO Added (grams as $CaCO_3$) | 6.244 | 6.433 | 6.622 |
| Reaction Conditions: | | | |
| Time (minutes) | 30 | 30 | 30 |
| Temperature (° C.) | 100 | 100 | 100 |
| Clarified Liquor: | | | |
| $Al_2O_3$ (grams in sample) | 4.529 | 4.479 | 4.458 |
| C.S. (grams in sample) | 17.93 | 17.76 | 17.58 |
| T.S. (grams in sample) | 18.77 | 18.60 | 18.38 |
| A/C | .2525 | .2522 | .2535 |
| C/S | .9556 | .9547 | .9560 |
| Calcium Aluminate Sludge: | | | |
| $Al_2O_3$ as calcium aluminate (grams) | 1.943 | 1.952 | 1.918 |
| $CaO/Al_2O_3$ (mol ratio) | 3.28 | 3.36 | 3.52 |
| $Al_2O_3$ soluble in liquor (grams) | .400 | .441 | .496 |

DEPHOSPHATING OF GREEN LIQUOR

| | Run 1 | Run 2 | Run 3 |
|---|---|---|---|
| Green Liquor: | | | |
| $Al_2O_3$ (grams/liter) | 162.29 | 162.29 | 162.29 |
| C.S. (grams/liter) | 187.81 | 187.81 | 187.81 |
| T.S. (grams/liter) | 216.58 | 216.58 | 216.58 |
| $P_2O_5$ (grams/liter) | 27.15 | 27.15 | 27.15 |
| A/C | .8604 | .8604 | .8604 |
| Volume of Sample (ml) | 100 | 100 | 100 |
| Calcium Aluminate Sludge: | | | |
| $Al_2O_3$ as Calcium Aluminate (grams) | 1.943 | 1.952 | 1.918 |
| $CaO/Al_2O_3$ (mol ratio) | 3.28 | 3.36 | 3.52 |
| $Al_2O_3$ soluble in liquor (grams) | .400 | .441 | .496 |
| $CaO/P_2O_5$ (mol ratio) | 3.27 | 3.37 | 3.47 |
| Reaction Conditions: | | | |
| Volumes (mls.) | 145 | 145 | 145 |
| Temperature (° C.) | 100 | 100 | 100 |
| Time (minutes) | 30 | 30 | 30 |
| Dephosphate Green Liquor: | | | |
| $Al_2O_3$ (grams/liter) | 127.6 | 127.8 | 127.4 |
| C.S. (grams/liter) | 183.3 | 185.6 | 188.7 |
| T.S. (grams/liter) | 195 | 197.7 | 197.2 |
| $P_2O_5$ (grams/liter) | 1.41 | .95 | .65 |
| A/C | .696 | .689 | .675 |
| $Al_2O_3$ (grams) | 18.497 | 18.539 | 18.468 |
| C.S. (grams) | 26.572 | 26.909 | 27.37 |
| $P_2O_5$ (grams) | .204 | .138 | .097 |
| Results: | | | |
| $Al_2O_3$ from calcium aluminate not recovered (percent) | 3.86 | 4.25 | 9.12 |
| $P_2O_5$ insolubilized (percent) | 92.6 | 94.9 | 96.4 |

Moreover, only 3.86% of the $Al_2O_3$ values associated with the calcium aluminate had not been solubilized to add to the aluminate content of the green liquor.

Runs 2 and 3 are similarly run except that the $CaO/Al_2O_3$ mol ratio of the calcium aluminate produced was greater with successive runs and also that the $CaO/P_2O_5$ charging ratio of calcium aluminate to the $P_2O_5$ content of the green liquors also increased.

In general, the calcium aluminate may be produced from the caustic aluminate liquors found in Bayer operations over a wide variety of operating conditions as regards temperature, caustic soda concentration and alumina concentration. For example, the calcium aluminate may be made from either green or spent liquors although the latter are preferred as being more economically used from a plant operation point of view than the green liquors. Thus, the spent liquors, after removal of a portion of the alumina content as calcium aluminate, provide a greater extraction potential when subsequently utilized in digestion operations.

As regards the caustic soda concentration during the reaction, wherein calcium aluminate is formed, it is preferred to operate under dilute conditions in order to increase the yield of calcium aluminate since sodium hydroxide is a product of the reaction and the higher caustic soda concentrations necessarily tend to cause a reverse reaction. However, for practical purposes, the concentrations of caustic soda found in Bayer operations are adequate, concentrations between 100 and 200 grams per liter caustic soda being generally preferred. The temperature of the solution during the calcium aluminate formation reaction is not critical in practical operations although the rate of reaction is greater with increasing temperatures, atmospheric boiling temperatures being preferred for practical operations in order to avoid the greater expenses associated with pressure type apparatus.

To realize the full benefit of the process described herein, wherein the calcium aluminate is made from Bayer liquors, it is important to perform the reaction under conditions as regards the concentration of sodium carbonate which do not permit the formation of calcium carbonate. Thus, the C/S ratio of the liquor employed for the formation of the calcium aluminate should be at or above the particular $Na_2CO_3$—NaOH equilibrium for the particular Bayer liquor. It is well known in the Bayer industry that these equilibrium ratios for Bayer liquors are somewhat below the pure $Na_2CO_3$—NaOH equilibrium solubilities in aqueous solutions. For the formation of calcium aluminate in Bayer liquors, C/S ratios above about .9 are preferred for caustic soda concentrations of about 150 to 200 grams per liter. Below these C/S ratios the lime tends to react with appreciable amounts of $Na_2CO_3$ to form caustic soda and insoluble calcium carbonate instead of the desired calcium aluminate. Thus, for the greatest formation of calcium aluminate the higher C/S ratios referred to supra are preferred. C/S ratios as low as .8 may be tolerated although the lower concentration of sodium carbonate indicated by the higher C/S ratios are preferred.

The results of laboratory experiments given in Table II clearly bring out the dephosphating reaction, wherein calcium aluminate as formed from a spent caustic aluminate solution, is employed for simultaneously dephosphating the liquor during the alkaline treatment of a wavellite type ore.

For the three runs indicated, lime was reacted with the alumina content of an artificial spent liquor to form calcium aluminate, and without separation of the reaction products, a wavellite ore was added thereto and digested therein to produce a dephosphated green caustic aluminate liquor. For example, in run 1 a spent liquor having an A/C ratio of .349 and a C/S ratio of .901 was mixed with 6.16 grams CaO and reacted for 30 minutes at 100° C. Thereafter, the liquor was analyzed and it was determined that calcium aluminate was produced having a mol ratio of $CaO/Al_2O_3$ of 3.688, 3.042 grams of alumina having been insolubilized by reaction with the lime and producing a decrease in the A/C ratio of from .349 in the spent liquor to .187 for the liquor to be employed for subsequent extraction purposes.

In step II, 18.57 grams of wavellite having 27.75% available alumina and 21.58% available $P_2O_5$ was added to the solution from step I and digested therein at 100° C. for 30 minutes. The green liquor produced had an A/C ratio of .575 and contained .019 gram of $P_2O_5$. Overall, 99.5% of the available $P_2O_5$ content had been insolubilized as calcium phosphate giving a green caustic aluminate liquor having less than 0.2 gram per liter $P_2O_5$. Simultaneously, 75.7% of the alumina associated with the calcium aluminate had been solubilized.

Table II

I. FORMATION OF CALCIUM ALUMINATE IN ARTIFICIAL SPENT LIQUOR

| | Run 1 | Run 2 | Run 3 |
|---|---|---|---|
| Spent Liquor: | | | |
| $Al_2O_3$ (grams/liter) | 62.46 | 62.46 | 62.46 |
| C.S. (grams/liter) | 178.9 | 178.9 | 178.9 |
| T.S. (grams/liter) | 198.3 | 198.3 | 198.3 |
| $Al_2O_3$ (grams in sample) | 6.629 | 7.383 | 9.613 |
| C.S. (grams in sample) | 18.98 | 21.14 | 24.67 |
| A/C | .349 | .349 | .349 |
| C/S | .901 | .901 | .901 |
| Lime Added: | | | |
| CaO (grams as CaO) | 6.16 | 6.16 | 6.16 |
| CaO charged/$Al_2O_3$ in Liquor (Mol Ratio) | .93 | .835 | .716 |
| Reaction Conditions: | | | |
| Temperature (° C.) | 100 | 100 | 100 |
| Time (minutes) | 30 | 30 | 30 |
| Liquor After Treatment: | | | |
| $Al_2O_3$ (grams) | 3.587 | 4.290 | 5.475 |
| C.S. (grams) | 19.157 | 21.315 | 24.801 |
| A/C | .187 | .201 | .221 |
| C/S | .911 | .908 | .901 |
| Results: | | | |
| $Al_2O_3$ insolubilized (grams) | 3.042 | 3.093 | 3.138 |
| C.S. made (grams) | .18 | .18 | .13 |
| $CaO/Al_2O_3$ insolubilized (Mol Ratio) | 3.688 | 3.627 | 3.576 |

II. SIMULTANEOUS DEPHOSPHATING DURING WAVELLITE DIGEST IN LIQUOR RESULTING FROM I

| | | | |
|---|---|---|---|
| Wavellite Added: | | | |
| Wavellite (grams) | 18.57 | 20.67 | 24.13 |
| $Al_2O_3$ Available (percent) | 27.75 | 27.75 | 27.75 |
| $P_2O_5$ Available (percent) | 21.58 | 21.58 | 21.58 |
| $Al_2O_3$ Available (grams) | 5.153 | 5.736 | 6.696 |
| $P_2O_5$ Available (grams) | 4.007 | 4.461 | 5.207 |
| Calcium Aluminate Charge: | | | |
| CaO in calcium aluminate/$P_2O_5$ in wavellite (Mol Ratio) | 3.9 | 3.5 | 3.0 |
| $Al_2O_3$ in calcium aluminate/$P_2O_5$ in wavellite (Mol Ratio) | 1.05 | .965 | .84 |
| Treatment: | | | |
| Temperature (°C.) | 100 | 100 | 100 |
| Time (minutes) | 30 | 30 | 30 |
| Green Liquor: | | | |
| $Al_2O_3$ (grams) | 11.041 | 12.667 | 14.41 |
| $P_2O_5$ (grams) | .019 | .055 | .576 |
| C.S. (grams) | 19.21 | 21.13 | 22.87 |
| $SiO_2$ (grams) | .30 | .174 | .318 |
| A/C | .575 | .580 | .631 |
| Results: | | | |
| $Al_2O_3$ recovered from calcium aluminate (percent) | 75.7 | 85.4 | 85.7 |
| $P_2O_5$ insolubilized (percent) | 99.5 | 98.8 | 88.9 |

Runs 2 and 3 were carried out in like manner as run 1 with varying amounts of lime and wavellite added. For example, considering step I wherein the calcium aluminate is formed, it will be noted that the amount of lime charged per mol of $Al_2O_3$ in the spent liquor decreased progressively from run 1 to run 3. Consequently, with identical reaction conditions the insoluble calcium aluminate containing compounds produced in successive runs had a decreasing mol ratio of $CaO/Al_2O_3$ indicating the greater completeness of the reaction with decreasing amounts of lime charged per mol of alumina in the liquor.

Likewise, by varying the amount of wavellite used in the digestion reaction of step II, the amount of lime associated with the calcium aluminate as compared to the $P_2O_5$ content of the wavellite, such as 3.9 as in run 1, are not productive of substantially greater dephosphating than when ratios of about 3.5 are used, as in run 2. Thus, in run 1, 99.5% of the available $P_2O_5$ content of the wavellite was insolubilized whereas, 98.8% was insolubilized in run 2. Moreover, run 2 with the lesser amount of $P_2O_5$ removed as compared to run 1 was nevertheless sufficient as regards dephosphating as compared to the liquors being fed to the autoprecipitation phases in conventional Bayer practice. Thus, less than .5 gram per liter $P_2O_5$ content resulted in run 2. Moreover, it is noteworthy that a substantial increase in the amount of alumina recovered from the calcium aluminate took place wherein the $CaO/P_2O_5$ charge was about 3.5.

Although the experimental procedure utilized for the material in Table II is such that the $P_2O_5$ content is insolubilized by reaction with the calcium aluminate during the actual digestion phase of the wavellite type ore, it is apparent from the material in Table I that the reaction can be successfully carried out also by employing the calcium aluminate after clarification of the insoluble alumina from the digestion phase. Thus, the insoluble calcium aluminate formed may be separated from the spent liquor prior to utilizing the same for solubilizing the alumina and phosphate content of the wavellite, the wavellite added and digested therein, the pregnant liquors clarified and the clarified liquors containing phosphate values subjected to the dephosphating reaction with calcium aluminate whereby a calcium phosphate product uncontaminated with digestion residues is obtained.

The dephosphating reaction proceeds more rapidly as higher temperatures are employed. However, for practical purposes atmospheric boiling temperatures are adequate. Likewise, the caustic concentration of the solution during the dephosphating reaction is not critical in practical operations to the substantial completion of the reaction, the caustic soda concentration conditions normally found in Bayer plant operations being also adequate.

Countercurrent operations may also successfully be employed for the dephosphating reaction. Thus, the calcium aluminate may be added to the solution which is least contaminated with $P_2O_5$, thereby ensuring substantially complete removal of the phosphate content as calcium phosphate because of the higher reaction potential as a result of the greater concentrations of the calcium aluminate; greater amounts of alumina associated with calcium aluminate being recovered as the unreacted calcium aluminate contacts the liquors containing the greatest concentrations of sodium phosphate.

To point up and emphasize the importance of dephosphating with calcium aluminate, the material presented in Table III is given. For the experimental procedure, lime in about the stoichiometric amounts to combine with the available $P_2O_5$ content of the wavellite together with wavellite was added to an artificial spent caustic liquor and without the opportunity to form calcium aluminate the extraction of the aluminum phosphate content of the wavellite was allowed to proceed.

*Table III*

DEPHOSPHATING WITH LIME SIMULTANEOUS TO WAVELLITE DIGEST

|  | Run 1 | Run 2 | Run 3 |
|---|---|---|---|
| Spent Liquor: |  |  |  |
| $Al_2O_3$ (grams/liter) | 54.75 | 58.3 | 62.7 |
| C.S. (grams/liter) | 173 | 184.3 | 198 |
| T.S. (grams/liter) | 195 | 208.7 | 224 |
| $Al_2O_3$ (grams) | 6.516 | 6.115 | 5.754 |
| A/C | .316 | .316 | .316 |
| C/S | .885 | .885 | .885 |
| Lime and Wavellite Addition: |  |  |  |
| Lime (grams as CaO) | 5.61 | 5.61 | 5.61 |
| $CaO/P_2O_5$ Available (Mol Ratio) | 3.11 | 3.31 | 3.51 |
| Wavellite (grams) | 21.2 | 19.89 | 18.72 |
| $Al_2O_3$ Available (percent) | 27.75 | 27.75 | 27.75 |
| $P_2O_5$ Available (percent) | 21.58 | 21.58 | 21.58 |
| $Al_2O_3$ Available (grams) | 5.88 | 5.515 | 5.19 |
| $P_2O_5$ Available (grams) | 4.574 | 4.292 | 4.04 |
| Reaction Conditions: |  |  |  |
| Temperature (° C.) | 100 | 100 | 100 |
| Time (minutes) | 30 | 30 | 30 |
| Green Liquor After Digest: |  |  |  |
| $Al_2O_3$ (grams) | 11.192 | 10.807 | 10.454 |
| $P_2O_5$ (grams) | 2.896 | 2.517 | 2.298 |
| C.S. (grams) | 14.38 | 13.73 | 13.12 |
| A/C | .828 | .787 | .797 |
| Results: |  |  |  |
| $Al_2O_3$ Available solubilized (percent) | 79.5 | 85 | 90.5 |
| $P_2O_5$ Insolubilized (percent) | 36.6 | 41.4 | 43.1 |

For example, in run 1 an artificial spent liquor having a caustic soda concentration of 173 grams per liter and A/C ratio of .316 was employed for extracting the alumina and phosphate content from 21.2 grams of wavellite wherein 5.61 grams of lime had been added for dephosphating purposes. The amount of lime added was equivalent to giving a mol ratio of $CaO/P_2O_5$ available in the wavellite of 3.11. After the reaction had been carried out for 30 minutes at 100° C., the green liquor resulting was analyzed.

It is apparent that lime actually suppresses the solubilization of the alumina as evidenced by the fact that only 79.5% of the available alumina was extracted in this case. Likewise, only 36.6% available $P_2O_5$ content of the liquor was insolubilized. Moreover, by increasing the ratio of lime charged to the available $P_2O_5$ content of the wavellite to a $CaO/P_2O_5$ ratio of 3.31 as in run 2 and 3.51 in run 3, the amount of $P_2O_5$ insolubilized as a result of the reaction did not materially increase. Thus, only 41.4% of the available $P_2O_5$ content was insolubilized in run 2 and 43.1% in run 3. It is apparent from a consideration of the material presented in Table II, wherein similar digesting conditions were employed during the dephosphating reaction with calcium aluminate and where substantially all of the $P_2O_5$ content was removed, that the lime was less effective for dephosphating purposes than calcium aluminate.

According to one phase of the herein described invention, a new and novel method of converting the hydrated alumina content of bauxites to calcium aluminate has been discovered which is particularly advantageous when employed for dephosphating a caustic aluminate liquor obtained, as for instance, from the alkaline treatment of wavellite or pseudo-wavellite types of ores. Thus, it has been discovered that the aluminous values in bauxites, such as those used in conventional Bayer type operations, may be converted to calcium aluminates by treatment in dilute caustic solutions with lime. Thereafter, the residues containing the calcium aluminates may advantageously be employed for removing the phosphate content of the phosphate containing caustic liquors such as result from the alkaline treatment of aluminum phosphate containing ores while simultaneously providing a substantial amount of alumina to the caustic aluminate solution. Thus, it becomes apparent to those skilled in the art that the alumina content of the caustic aluminate liquors is increased from an alumina source other than the aluminous phosphatic ore being utilized as the primary source of alumina while simultaneously decreasing the phosphate content of the pregnant liquors. Indirectly, when the calcium aluminate is produced in the Bayer spent liquor the alumina added to the green liquor is from the aluminum phosphate ore.

In general, the process for producing calcium aluminate by the dilute caustic soda reaction with bauxites is advantageously carried out in the presence of lime in caustic solutions of about 10 grams per liter caustic soda. Caustic soda concentrations below 75 grams per liter are definitely preferred wherein the bauxite being treated contains appreciable amounts of silica because the higher caustic soda concentrations favor the loss of alumina through the formation of insoluble silicate complexes. High temperatures, moreover, are not critical to the reaction for practical purposes but, in fact, temperatures from about 80° C. to the boiling point of the solution are most advantageous in that the mild conditions are especially adapted to the utilization of high silica containing bauxites such as those from Arkansas, since these conditions substantially avoid the losses of alumina and soda by alkaline attack on the silica that would result under more drastic conditions.

In general, about 3 mols of lime may be used per mol of alumina in the bauxite, a slight excess being preferred. Thus, from about 3 mols to 3.6 mols lime are preferred under operating conditions of about 100° C. and 10 grams per liter caustic soda to transform the hydrated alumina content to calcium aluminate.

Apparently, the mechanism of the reaction is that the soda values of the caustic solutions react with the alumina, thereby solubilizing same, whereafter they react with the lime to insolubilize the aluminates as calcium aluminate and free the caustic for further extraction purposes. Consequently, the caustic soda acts as a catalyst for the formation of calcium aluminate. However, the invention is not to be construed as limited in scope by the theoretical explanations presented.

The material presented in Table IV clearly shows the advantages of producing calcium aluminate according to the herein described process and thereafter employing the product for causticizing of the sodium phosphate obtained from the alkaline treatment of an aluminum phosphate ore.

Table IV

TRANSFORMATION OF ALUMINA CONTENT OF HIGH SILICA BAUXITE TO CALCIUM ALUMINATE

|  | Run 1 | Run 2 | Run 3 | Run 4 |
|---|---|---|---|---|
| Liquor: |  |  |  |  |
| C.S. (grams/liter) | 10 | 10 | 10 | 10 |
| Volume (mls.) | 50 | 50 | 50 | 50 |
| C.S. (grams in sample) | .5 | .5 | .5 | .5 |
| Lime and Bauxite Addition: |  |  |  |  |
| Bauxite Added (grams) | 9.17 | 8.327 | 7.407 | 6.648 |
| $Al_2O_3$ Available (percent) | 40 | 40 | 40 | 40 |
| $SiO_2$ Available (percent) | 11 | 11 | 11 | 11 |
| $Al_2O_3$ Available (grams) | 3.667 | 3.391 | 3.022 | 2.712 |
| CaO Added (grams as CaO) | 5.85 | 5.85 | 5.85 | 5.85 |
| $CaO/Al_2O_3$ in bauxite (Mol Ratio) | 2.9 | 3.2 | 3.6 | 4.0 |
| $CaO/P_2O_5$ in wavellite (Mol Ratio) | 3.5 | 3.5 | 3.5 | 3.5 |
| Reaction Conditions: |  |  |  |  |
| Temperature (°C.) | 100 | 100 | 100 | 100 |
| Time (minutes) | 60 | 60 | 60 | 60 |

WAVELLITE EXTRACTION AND DEPHOSPHATING REACTION

|  | Run 1 | Run 2 | Run 3 | Run 4 |
|---|---|---|---|---|
| Spent Liquor Addition: |  |  |  |  |
| $Al_2O_3$ (grams/liter) | 57.56 | 57.56 | 57.56 | 57.56 |
| C.S. (grams/liter) | 224.8 | 224.8 | 224.8 | 224.8 |
| T.S. (grams/liter) | 256.7 | 256.7 | 256.7 | 256.7 |
| $Al_2O_3$ (grams) | 5.572 | 5.484 | 5.319 | 5.096 |
| A/C | .256 | .256 | .256 | .256 |
| Wavellite Addition: |  |  |  |  |
| Wavellite added (grams) | 19.65 | 19.65 | 19.65 | 19.65 |
| $Al_2O_3$ Available (percent) | 27.75 | 27.75 | 27.75 | 27.75 |
| $P_2O_5$ Available (percent) | 21.58 | 21.58 | 21.58 | 21.58 |
| $Al_2O_3$ (grams) | 5.45 | 5.45 | 5.45 | 5.45 |
| $P_2O_5$ (grams) | 4.24 | 4.24 | 4.24 | 4.24 |
| Reaction Conditions: |  |  |  |  |
| Temperature (° C.) | 100 | 100 | 100 | 100 |
| Time (minutes) | 30 | 30 | 30 | 30 |
| Green Liquor: |  |  |  |  |
| $Al_2O_3$ (grams) | 14.046 | 13.819 | 13.273 | 12.717 |
| C.S. (grams) | 22.23 | 21.40 | 20.24 | 19.57 |
| T.S. (grams) | 24.60 | 23.08 | 22.20 | 21.6 |
| $P_2O_5$ (grams) | .151 | .121 | 2.98 | .340 |
| $SiO_2$ (grams) | .315 | .295 | .266 | .236 |
| A/C | .631 | .646 | .654 | .65 |
| Results: |  |  |  |  |
| $Al_2O_3$ extracted from Bauxite (percent) | 77.51 | 84.93 | 82.86 | 80.06 |
| $P_2O_5$ Insolubilized (percent) | 96.4 | 97.0 | 92.8 | 92 |
| C.S. Lost (grams) | .40 | .26 | .07 | .08 |

As an example of the experimental procedure, in run 2, 8.327 grams of a high silica bauxite, such as found in Arkansas, and 5.85 grams of lime were slurried in 50 milliliters of a 10 gram per liter caustic soda solution. The bauxite had 3.391 grams of available alumina, or 40% available alumina, and contained about 11% $SiO_2$. The amount of lime charged was equivalent to 3.2 mols of lime added per mol of available alumina in the bauxite or equivalent to a $CaO/P_2O_5$ mol ratio of lime to available $P_2O_5$ content of the wavellite of 3.5. The reaction between the lime and hydrated alumina in the bauxite was allowed to proceed for 60 minutes at 100° C. Thereafter, an artificial spent liquor containing 5.484 grams of alumina was added to the slurry from the bauxite alumina transformation step together with 19.65 grams of wavellite. The spent liquor had an A/C weight ratio of .256 and had a caustic soda and total soda concentration of 224.8 and 256.7 grams per liter, respectively. The wavellite had 5.45 grams available alumina in the sample and 4.24 grams of available $P_2O_5$ content. The slurry was then heated at 100° C. for 30 minutes to allow the caustic soluble alumina from the wavellite to be solubilized and the reaction between the calcium aluminate and available $P_2O_5$ content of the wavellite to proceed. Thereafter, the green liquor was analyzed. It was found that 84.93% of the available alumina from the bauxite had been solubilized and 97% of the soluble $P_2O_5$ content of the wavellite insolubilized. Accordingly, a solution was obtained which contained .121 grams of $P_2O_5$ and .295 gram of $SiO_2$. Thus, the $P_2O_5$ content was removed from the solution by reaction with calcium aluminate and a solution acceptably low in $P_2O_5$ content obtained for the autoprecipitation of alumina hydrate.

It is apparent from an inspection of the four runs presented in Table IV that for a $CaO/P_2O_5$ ratio of about 3.5, a $CaO/Al_2O_3$ ratio of lime charged to alumina in the bauxite of about 3.2 is preferred. Thus, with a $CaO/Al_2O_3$ mol ratio of 4.0, as in run 4, both the amount of $Al_2O_3$ extracted from the bauxite and the $P_2O_5$ content insolubilized decreased as compared to run 2. Likewise for a $CaO/Al_2O_3$ mol ratio of 2.9, as in run 1 there was a smaller recovery of available alumina from the bauxite and decreased percentage of $P_2O_5$ insolubilized.

It is apparent that utilization of high silica containing bauxites is not essential to the transformation of the hydrated alumina content of the bauxites to calcium aluminate but that any hydrated alumina containing ore may be employed in the reaction. However, since the transformation can be caused to take place under the mild conditions as regards temperature and caustic soda concentration, the applicability of the process to the high silica bauxites is important since the siliceous material is relatively unattacked by the caustic soda as is found in normal alkaline processes. Thus, it is preferable to carry out the transformation at about atmospheric boiling temperatures under caustic soda concentration conditions about 10 grams per liter. Higher caustic soda conditions may be employed but are unnecessary since the dissolution of silica increases with increasing caustic soda concentrations.

Dephosphating of the liquors arising from the alkaline decomposition of the aluminum phosphate containing ores with the calcium aluminate produced from the transformation of the hydrate alumina in the bauxite may be carried out prior to the clarification of the residues from the aluminum phosphate digest or afterwards with comparable results. It is obvious, that a residue will be obtained higher in calcium phosphates in the latter case than in the former.

As in the case where the calcium aluminate is used in the more pure forms, such as produced from spent liquor, the calcium aluminate containing muds from the transformation step may be employed in counter current operations for substantially complete dephosphating of the sodium phosphate containing green liquors and recovery of the alumina content.

It is also apparent to those skilled in the art that "lime" as used herein for reaction with the alumina content of the bauxites and/or for reaction with the spent caustic aluminate liquors includes calcium hydroxide, slaked lime, and the equivalents thereof.

The scope of the invention will be more fully understood by a consideration of Figures 1 and 2 and the discussion relating thereto.

Figure 1 shows schematically one system embodying the herein described invention for producing calcium aluminate and utilizing same for dephosphating a green caustic aluminate liquor resulting from the alkaline digest of an aluminum phosphatic ore wherein a green caustic aluminate liquor suitably low in $P_2O_5$ content for autoprecipitation is produced.

Lime 1 is slurried with spent caustic aluminate liquor 2 in reaction system 3 and the reaction allowed to proceed until a $CaO/Al_2O_3$ mol ratio of lime to alumina in the insoluble products of about 3.4 is obtained. The slurry is led from the reaction system 3 to the clarification system 4 by means of line 5 wherein the calcium aluminate is removed as through line 6 and the clarified liquors forwarded to digestion system 7 through line 8. Aluminum phosphate ore 9 is digested in the clarified liquors 8 from clarification system 4 to solubilize the aluminum phosphatic values therefrom and forwarded to clarification system 10 through line 11 wherein the ore residues are separated as at 12, the clarified green caustic aluminate liquors containing soluble sodium phosphates being led to dephosphating system through line 14.

The calcium aluminate is charged through line 6 from clarification system 4 to the dephosphating system 13 in an amount to produce a CaO/P$_2$O$_5$ ratio of about 3.5 and the reaction allowed to proceed until an acceptably low P$_2$O$_5$ content of the green caustic aluminate liquors is obtained suitable for the production of alumina for reduction purposes. The effluent liquors from dephosphating system 13, containing less than about 2 grams of P$_2$O$_5$ per liter are led by means of line 15 to clarification system 16 wherein the reaction product of calcium phosphate is removed as at 17 and the clarified green caustic aluminate liquors, substantially free of the solubilized sodium phosphates are forwarded to autoprecipitation for the recovery of the alumina as trihydrate alumina through line 18.

It is apparent from an inspection of Figure 1 and the disclosure herein presented that, depending on the desirability of obtaining a calcium phosphate product substantially uncontaminated with ore residues, the clarification of the residues, as in clarification system 10, is optional. Thus, the residues from digestion system 7 may be removed in clarification system 16 together with the insoluble calcium phosphate reaction products. In such a system it is preferable not to clarify the calcium aluminate from the spent liquor as in clarification system 4 but rather to allow the calcium aluminate containing spent liquor from reaction system 3 to proceed directly to digestion system 7 wherein simultaneous dephosphating will take place during the degistion of the aluminum phosphate ore. Thereafter, the effluent from digestion system 7 may be clarified to produce a calcium phosphate containing ore residue and green caustic aluminate liquor suitable for the autoprecipitation of alumina trihydrate.

Figure 2 shows one embodiment of a system wherein the calcium aluminate for dephosphating purposes is derived from a bauxite and used for dephosphating a green caustic aluminate liquor containing soluble sodium phosphate from the digest of an ore containing aluminous values predominantly as aluminum phosphate.

Thus, lime 19 and bauxite 20 are slurried in a dilute caustic soda solution 21 in reaction system 22 to produce a CaO/Al$_2$O$_3$ mol ratio of about 3.4 in the insoluble calcium aluminate reaction products. Aluminum phosphate ore 23, such as wavellite, is digested in spent caustic aluminate liquor 24 in digestion system 25 to extract the aluminous phosphatic values and forwarded to clarification system 26 through line 26'. Therein the ore residues are separated as at 27 and the green phosphate containing caustic aluminate liquors forwarded through line 28 to dephosphating system 29 wherein calcium aluminate containing products from reaction system 22 are inserted through line 30. Therein the calcium aluminate reacts with the soluble sodium phosphate to produce insoluble calcium phosphate and to solubilize the aluminate values associated with the calcium aluminate in substantial amounts, thereby increasing the alumina content of the liquors inserted as at 28. The dephosphated liquors are then forwarded to clarification system 31, through line 32 and the calcium phosphate containing ore residues are separated as at 33. The dephosphate green caustic aluminate liquors are removed through line 34 and forwarded to an autoprecipitation system for the recovery of the trihydrate alumina which may be calcined to produce a reduction grade alumina.

It is apparent that modifications of the system presented in Figure 2 may likewise be made and still remain within the scope of the invention. For example, clarification of the effluent from digestion system 25 in clarification system 26 is optional depending upon the amount of ore residues desired with the calcium phosphate products removed as at 33. Thus, the effluent from digestion system 25 may be led directly to dephosphating system 29 and the insoluble residues from the aluminum phosphate ore digest removed together with the calcium phosphate as at 33 from clarification system 31.

High silica bauxites as used herein mean bauxites containing greater than about 6% SiO$_2$.

What is claimed is:

1. In a process for recovering the aluminous values from ore containing said aluminous values predominantly as aluminum phosphates wherein the said aluminous values together with the phosphate values are solubilized in caustic liquor, the soluble phosphate values insolubilized, and the resulting liquor treated for the recovery of the alumina content, the method of insolubilizing said soluble phosphate values which comprises reacting calcium aluminate therewith to insolubilize the phosphate values as calcium phosphate.

2. The process for removing the P$_2$O$_5$ content from the green caustic aluminate liquor resulting from the caustic extraction of the caustic soluble aluminous and phosphatic values from ore containing the aluminous values predominantly in combination with phosphatic values to obtain a green caustic aluminate liquor substantially free of said P$_2$O$_5$ content and suitable for the recovery of the soluble aluminous values as alumina trihydrate, which comprises reacting calcium aluminate with said P$_2$O$_5$ content to insolubilize same as calcium phosphate.

3. In a process for recovering the aluminous values from ore containing said aluminous values predominantly as aluminum phosphate wherein said aluminous values are solubilized in caustic liquor and subsequently recovered therefrom, the method of obtaining a caustic aluminate liquor substantially free of soluble phosphate values after the solubilization of said aluminous values in caustic liquor, which comprises carrying out said solubilization of the aluminous values in caustic liquor in the presence of calcium aluminate in amounts sufficient to insolubilize substantially all of the soluble phosphate values as calcium phosphate.

4. The process for obtaining a green caustic aluminate liquor substantially free of P$_2$O$_5$ content resulting from the caustic extraction of the caustic soluble aluminous values from ore containing the aluminous values predominantly in combination with phosphatic values and to obtain a green caustic aluminate liquor suitable for the recovery of the soluble aluminous values as alumina trihydrate, which comprises carrying out said caustic extraction of the aluminous values in the presence of calcium aluminate in amounts sufficient to insolubilize substantially all of the soluble phosphate values as calcium phosphate.

5. The process for removing the soluble P$_2$O$_5$ content from the green caustic aluminate liquor resulting from the caustic extraction of the available alumina and phosphate values from ore containing the alumina values predominantly in combination with phosphatic values, and increasing the alumina content of said green caustic aluminate liquor, to obtain a green caustic aluminate liquor substantially free of said P$_2$O$_5$ content and suitable for the recovery of the aluminous values as alumina trihydrate, which comprises reacting calcium aluminate with the soluble P$_2$O$_5$ content in amounts sufficient to insolubilize substantially all of said P$_2$O$_5$ content as calcium phosphate whereby substantial quantities of the aluminate values associated with the calcium aluminate are solubilized in the green caustic aluminate liquor.

6. The process for obtaining a green caustic alminate liquor substantially free of P$_2$O$_5$ content resulting from the caustic extraction of the caustic soluble aluminous values from ore containing the aluminous values predominantly in combination with phosphatic values, and simultaneously supplying a portion of the soluble aluminous values in the green caustic aluminate liquor from a source other than directly from the ore containing the aluminous values predominantly in combination with the phosphatic values, to obtain a green caustic aluminate liquor suitable for the recovery of the soluble aluminous values as alumina trihydrate, which comprises carrying out said caustic extraction of the aluminous values in the presence of calcium aluminate in amounts sufficient to insolubilize substantially all of the soluble phosphate values as calcium phosphate whereby substantial quantities of the aluminate values associated with the calcium aluminate are solubilized in the caustic extraction liquor.

7. The process for removing the soluble $P_2O_5$ content from the green caustic aluminate liquor resulting from the alkaline extraction of the available alumina and phosphate values from ore containing the alumina values predominantly in combination with phosphatic values in spent caustic aluminate liquor to obtain a green caustic aluminate liquor substantially free of said $P_2O_5$ content and suitable for the recovery of the aluminous values as alumina trihydrate, which comprises reacting calcium aluminate with the soluble $P_2O_5$ content in an amount such that there is supplied from about 3 to 4 mols of CaO per mol of $P_2O_5$ to be insolubilized, thereby insolubilizing substantially all of said $P_2O_5$ content as calcium phosphate.

8. In a process for recovering the aluminous values from ore containing said aluminous values predominantly as aluminum phosphate wherein said aluminous values are solubilized in caustic liquor and subsequently recovered therefrom, the method of obtaining a caustic aluminate liquor substantially free of soluble $P_2O_5$ content after the solubilization of said aluminous values in caustic liquor, which comprises carrying out said solubilization of the aluminous values in caustic liquor in the presence of calcium aluminate in an amount such that there is supplied from about 3 to 4 mols of CaO per mol of $P_2O_5$ to be insolubilized, thereby insolubilizing substantially all of said $P_2O_5$ content as calcium phosphate.

9. The process for removing the soluble $P_2O_5$ content from the green caustic aluminate liquor resulting from the caustic extraction of the available alumina and phosphate values from ore containing the alumina values predominantly in combination with phosphate values, and increasing the alumina content of said green caustic aluminate liquor to obtain a green caustic aluminate liquor substantially free of said $P_2O_5$ content and suitable for the recovery of the aluminous values as alumina trihydrate, which comprises reacting calcium aluminate with the soluble $P_2O_5$ content, said calcium aluminate having a mol ratio of $CaO/Al_2O_3$ of from about 3.0 to 3.6, in an amount such that there is supplied from about 3 to 4 mols of CaO per mol of $P_2O_5$ to be insolubilized, thereby insolubilizing substantially all of said $P_2O_5$ content as calcium phosphate and solubilizing a substantial portion of the alumina values associated with the calcium aluminate.

10. The process for obtaining a green caustic aluminate liquor substantially free of $P_2O_5$ content resulting from the caustic extraction of the caustic soluble aluminous values from ore containing the aluminous values predominantly in combination with phosphatic values, and for simultaneously supplying a portion of the soluble aluminous values in the green caustic aluminate liquor from a source other than directly from the ore containing the aluminous values predominantly in combination with the phosphatic values, to obtain a green caustic aluminate liquor suitable for the recovery of the soluble aluminous values as alumina trihydrate, which comprises carrying out said caustic extraction of the aluminous values in the presence of calcium aluminate, said calcium aluminate having a mol ratio of $CaO/Al_2O_3$ of from about 3.0 to 3.6, in an amount such that there is supplied from about 3 to 4 mols of CaO per mol of $P_2O_5$ to be insolubilized, thereby insolubilizing substantially all of said $P_2O_5$ content as calcium phosphate and solubilizing a substantial portion of the aluminate values associated with the calcium aluminate.

11. A method for the recovery of alumina from high silica hydrated alumina-containing materials, and aluminous materials containing aluminum phosphate, which comprises reacting said high silica alumina hydrate-containing material with an excess of lime in the presence of caustic soda solution to convert the hydrated alumina to insoluble calcium aluminate, extracting the aluminum phosphate from the second-mentioned aluminous material with caustic aluminate liquor to form a pregnant caustic aluminate liquor containing sodium phosphate, and reacting the calcium aluminate produced from the high silica hydrated alumina-containing material with the sodium phosphate in said pregnant caustic aluminate liquor to dephosphate said liquor by precipitation of insoluble calcium phosphate, while forming additional sodium aluminate from the calcium aluminate, and thereafter recovering from the pregnant caustic aluminate liquor alumina thus extracted from both sources of aluminous materials.

12. A process for the recovery of alumina from siliceous hydrated alumina-containing materials and from aluminum phosphate-containing materials, which comprises reacting said hydrated alumina-containing material with lime in the presence of a dilute caustic soda solution to form insoluble calcium aluminate, said lime being added in amounts from about 3 to 3.6 mols CaO per mol of $Al_2O_3$, separately extracting the aluminum phosphate from the aluminum phosphate-containing material in caustic aluminate liquor to produce a pregnant caustic aluminate liquor containing soluble sodium phosphate, and reacting the calcium aluminate with the sodium phosphate in said pregnant caustic aluminate liquor to precipitate insoluble calcium phosphate and to form soluble sodium aluminate from the alumina of the insoluble calcium aluminate, said calcium aluminate being added in amount to provide from about 3 to 3.5 mols of CaO per mol of $P_2O_5$ in the aluminum phosphate-containing material, and thereafter recovering alumina extracted from both the siliceous hydrated alumina-containing material and the aluminum phosphate-containing material from the pregnant caustic aluminate liquor.

13. A process for the recovery of alumina from high silica bauxites and aluminum phosphate-containing materials without substantial $SiO_2$ and $P_2O_5$ contamination, which comprises reacting said bauxite with lime in amount to provide from about 3 to 3.6 mols of CaO per mol of $Al_2O_3$ in said bauxite in the presence of a dilute caustic soda solution containing less than 75 grams per liter caustic soda, and at temperatures not exceeding the atomspheric boiling point of said caustic soda solution, to form an insoluble calcium aluminate containing material, extracting the aluminum phosphate-containing material in caustic aluminate liquor at temperatures of from about 80° C. to the atmospheric boiling point thereof to produce a pregnant caustic aluminate liquor containing sodium phosphate, reacting the previously prepared calcium aluminate material in amount to provide from about 3 to 3.5 mols of CaO per mol of $P_2O_5$ in said aluminum phosphate-containing material with the sodium phosphate content of said liquor to form insoluble calcium phosphate thereby reducing the $P_2O_5$ content of the liquor to less than 2 grams per liter, and to increase the alumina content of said liquor by formation of sodium aluminate from the alumina content of said calcium aluminate, and recovering alumina from the resulting pregnant caustic aluminate liquor.

14. A process for recovery of alumina from siliceous hydrated alumina-containing materials which comprises reacting said material with lime in the presence of a dilute caustic soda solution at a temperature not exceeding the boiling point of said solution to form calcium aluminate, adding the calcium aluminate so formed to a caustic aluminate liquor containing sodium phosphate to convert the alumina of the calcium aluminate to soluble sodium aluminate and to precipitate calcium phosphate, and thereafter recovering alumina from the sodium aluminate enriched liquor.

15. A wet process for converting the hydrated alumina content of a siliceous hydrated alumina-containing material to calcium aluminate without reaction of substantial quantities of the contained silica, which comprises reacting said hydrated alumina content with lime as primary reactants, the lime being added in amount to provide from about 3 to 3.6 mols of CaO per mol of $Al_2O_3$ in said material, said reaction being conducted in a dilute caustic soda solution containing from about 10 to less than 75 grams per liter caustic soda at temperatures from about 80° C. to the atmospheric boiling point of said caustic soda solution.

16. A process for recovering alumina from aluminous materials containing caustic soluble alumina predominantly as aluminum phosphate in which the aluminum phosphate is extracted in recycled spent sodium aluminate liquor from which alumina has been recovered, which comprises reacting lime with the alumina content of said recycled spent sodium aluminate liquor to form insoluble calcium aluminate and to lower the alumina-to-caustic soda ratio of said spent liquor, extracting the aluminum phosphate from the aluminous material with the lime-treated spent liquor, reacting the calcium aluminate with the phosphate material contained in the extraction liquor to remove phopshate as insoluble calcium phosphate and to form additional sodium aluminate, and thereafter recovering alumina from the liquor.

17. A process according to claim 16 in which the extraction of the aluminum phosphate in the spent liquor is conducted in the presence of the precipitated calcium aluminate.

18. A process according to claim 16 in which the recycled spent sodium aluminate liquor contains caustic soda as sodium aluminate and free sodium hydroxide, and also contains sodium carbonate, and the ratio of caustic soda concentration to total soda concentration therein is above the $Na_2CO_3$—NaOH equilibrium ratio at the caustic soda concentration of said spent liquor.

19. A process according to claim 16 in which the recycled spent sodium aluminate liquor contains caustic soda as sodium aluminate and free sodium hydroxide, and also contains sodium carbonate, and the ratio of caustic soda concentration to total soda concentration therein is above about .9 and the caustic soda concentration thereof is between about 150 and 200 grams per liter.

20. A wet method of forming calcium aluminate from the hydrated alumina content of aluminous materials, which comprises reacting lime with said hydrated alumina content as the primary reactants in the presence of a dilute solution of sodium hydroxide, the lime being provided in amount from about 3 to about 3.6 mols of CaO per mol of $Al_2O_3$ in said aluminous material.

21. A wet method of transforming the hydrated alumina content of siliceous aluminous materials to calcium aluminate, which comprises reacting lime with said hydrated alumina content as primary reactants in the presence of a dilute caustic soda solution containing less than about 75 grams per liter caustic soda at temperatures between about 80° C. and the atmospheric boiling point of the caustic soda solution, the lime being added in amount to provide from about 3 to about 3.6 mols CaO per mol of $Al_2O_3$ in the aluminous material.

22. A wet method of transforming the hydrated alumina content of siliceous bauxite to calcium aluminate while avoiding formation of substantial quantities of insoluble alkali aluminum silicate, which comprises reacting lime with said hydrated alumina content of the bauxite as primary reactants in a dilute caustic soda solution containing about 10 grams per liter of caustic soda, the total quantity of caustic soda being in minor amount with respect to said lime and the hydrated alumina content of the bauxite, the lime being added in amount to provide from about 3 to about 3.6 mols of CaO per mol of $Al_2O_3$ in the bauxite, and conducting the reaction at temperatures of from about 80° C. to the atmospheric boiling point of the caustic soda solution.

References Cited in the file of this patent

UNITED STATES PATENTS

| | | |
|---|---|---|
| 1,845,876 | Huber | Feb. 16, 1932 |
| 2,079,847 | Fiske | May 11, 1937 |
| 2,557,891 | Porter | June 19, 1951 |
| 2,591,436 | James | Apr. 1, 1952 |
| 2,668,751 | Porter | Feb. 9, 1954 |

OTHER REFERENCES

Mellor: "Comprehensive Treatise on Inorganic and Theoretical Chemistry," vol. 5, pages 290–292 (1924), publ. by Longmans, Green and Co., New York.

UNITED STATES PATENT OFFICE
CERTIFICATE OF CORRECTION

Patent No. 2,903,338            September 8, 1959

John L. Porter

It is hereby certified that error appears in the printed specification of the above numbered patent requiring correction and that the said Letters Patent should read as corrected below.

Column 2, line 61, for "provides" read -- provide --; column 4, line 31, Table I, fourth column thereof, under the heading "Run 3", opposite "T.S. (grams in sample)" under "Clarified Liquor" for "18 38" read -- 18.38 --; column 6, strike out "Table II" appearing between lines 1 to 45, and insert the same after "wavellite type ore." in column 5, line 50 and before the paragraph beginning with "For the three runs indicated," in line 51; column 9, line 47, Table IV, fourth column thereof, under the heading "Run 3", opposite "$P_2O_5$ (grams)" under "Green Liquor", for "2.98" read -- .298 --; column 11, line 39, for "degistion" read -- digestion --.

Signed and sealed this 30th day of August 1960.

(SEAL)
Attest:

ERNEST W. SWIDER            ROBERT C. WATSON
Attesting Officer            Commissioner of Patents